(12) United States Patent
Hilliard et al.

(10) Patent No.: US 10,384,668 B2
(45) Date of Patent: Aug. 20, 2019

(54) ELECTRIC-ONLY DRIVING WHEN APPROACHING FREQUENT DESTINATIONS

(71) Applicant: FORD GLOBAL TECHNOLOGIES, LLC, Dearborn, MI (US)

(72) Inventors: Steven Hilliard, Monroe, MI (US); Jordan Mazaira, Dearborn Heights, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 15/476,093

(22) Filed: Mar. 31, 2017

(65) Prior Publication Data

US 2018/0281772 A1   Oct. 4, 2018

(51) Int. Cl.
| | | |
|---|---|---|
| B60W 20/12 | (2016.01) | |
| B60W 20/13 | (2016.01) | |
| B60W 20/15 | (2016.01) | |
| B60L 58/13 | (2019.01) | |
| B60L 50/15 | (2019.01) | |
| B60L 50/60 | (2019.01) | |

(52) U.S. Cl.
CPC .............. *B60W 20/12* (2016.01); *B60L 50/15* (2019.02); *B60L 50/60* (2019.02); *B60L 58/13* (2019.02); *B60W 20/13* (2016.01); *B60W 20/15* (2016.01); *B60L 2240/44* (2013.01); *B60L 2240/62* (2013.01); *B60L 2240/70* (2013.01); *B60L 2270/142* (2013.01); *B60W 2510/244* (2013.01); *B60W 2710/06* (2013.01); *Y02T 10/6286* (2013.01); *Y02T 10/7005* (2013.01); *Y02T 10/92* (2013.01); *Y02T 90/14* (2013.01); *Y10S 903/903* (2013.01)

(58) Field of Classification Search
CPC combination set(s) only.
See application file for complete search history.

(56) References Cited

U.S. PATENT DOCUMENTS

| | | | |
|---|---|---|---|
| 8,818,589 B2 | 8/2014 | Frederick et al. | |
| 2010/0044131 A1* | 2/2010 | Teraya | B60K 6/445 180/65.265 |
| 2010/0280687 A1* | 11/2010 | Tate, Jr. | B60W 10/06 701/22 |
| 2011/0166731 A1 | 7/2011 | Kristinsson et al. | |
| 2013/0166125 A1* | 6/2013 | Yamamoto | B60L 7/14 701/22 |
| 2013/0184915 A1* | 7/2013 | Boskovitch | B60W 20/00 701/22 |
| 2015/0025727 A1 | 1/2015 | Engman et al. | |

(Continued)

*Primary Examiner* — Adam D Tissot
*Assistant Examiner* — Edward J Pipala
(74) *Attorney, Agent, or Firm* — David Kelley; Brooks Kushman P.C.

(57) ABSTRACT

A system for a vehicle includes a traction battery, an engine, and a controller configured to inhibit requests to start the engine in response to both the vehicle being within a first radius about a previously-identified frequent destination and an available battery energy being greater than twice a total battery energy expended during a prior trip to the destination from a second radius about the destination, the second radius being smaller than the first radius.

20 Claims, 6 Drawing Sheets

(56) References Cited

U.S. PATENT DOCUMENTS

| | | | |
|---|---|---|---|
| 2015/0197235 A1* | 7/2015 | Yu | F02D 29/02 701/22 |
| 2015/0274156 A1* | 10/2015 | Phillips | B60W 10/06 701/22 |
| 2015/0291145 A1* | 10/2015 | Yu | B60W 10/06 701/22 |
| 2016/0137185 A1* | 5/2016 | Morisaki | B60K 6/442 701/22 |
| 2017/0072937 A1* | 3/2017 | Kapadia | B60W 20/12 |

* cited by examiner

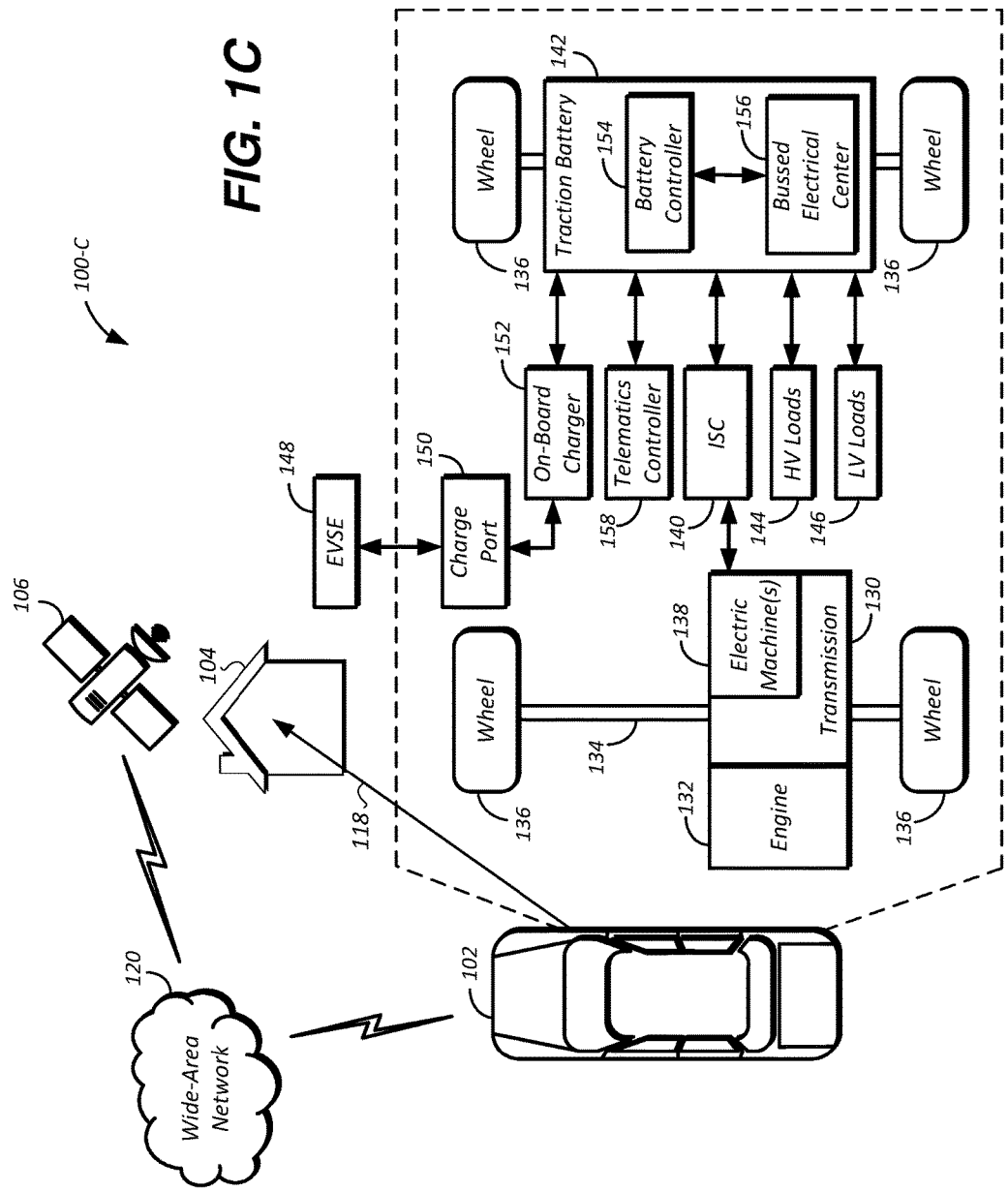

| Stored Destination A 108-A | Destination Coordinates 164-A | Loc. Approach Avg., $E_{app\_avg\_loc}$ 166-A | Loc. Silent Drive Avg., $E_{silent\_avg\_loc}$ 168-A |
|---|---|---|---|
| Stored Destination B 108-B | Destination Coordinates 164-B | Loc. Approach Avg., $E_{app\_avg\_loc}$ 166-B | Loc. Silent Drive Avg., $E_{silent\_avg\_loc}$ 168-B |
| ... | ... | ... | ... |
| Stored Destination n 108-n | Destination Coordinates 164-n | Loc. Approach Avg., $E_{app\_avg\_loc}$ 166-n | Loc. Silent Drive Avg., $E_{silent\_avg\_loc}$ 168-n |

On-Board Data Store
110

ELECTRIC-ONLY DRIVING WHEN APPROACHING FREQUENT DESTINATIONS

TECHNICAL FIELD

The present disclosure relates to systems and methods for using a silent drive mode of an electric vehicle when approaching a previously-learned frequent destination.

BACKGROUND

The term "electric vehicle" can be used to describe vehicles having at least one electric motor for vehicle propulsion, such as battery electric vehicles (BEV), hybrid electric vehicles (HEV), and plug-in hybrid electric vehicles (PHEV). A BEV includes at least one electric motor, wherein the energy source for the motor is a battery that is re-chargeable from an external electric grid. An HEV includes an internal combustion engine and one or more electric motors, wherein the energy source for the engine is fuel and the energy source for the motor is a battery. In an HEV, the engine is the main source of energy for vehicle propulsion with the battery providing supplemental energy for vehicle propulsion (the battery buffers fuel energy and recovers kinetic energy in electric form). A PHEV is like an HEV, but the PHEV has a larger capacity battery that is rechargeable from the external electric grid. In a PHEV, the battery is the main source of energy for vehicle propulsion until the battery depletes to a low energy level, at which time the PHEV operates like an HEV for vehicle propulsion.

SUMMARY

A system for a vehicle includes a traction battery, an engine, and a controller configured to inhibit requests to start the engine in response to both the vehicle being within a first radius about a previously-identified frequent destination and an available battery energy being greater than twice a total battery energy expended during a prior trip to the destination from a second radius about the destination, the second radius being smaller than the first radius.

A method includes inhibiting, by a controller, requests to start an engine of a vehicle in response to the vehicle being within a first radius about a previously-identified frequent destination and an available energy of a battery of the vehicle being greater than twice a total battery energy expended during a prior trip to the destination from a second radius about the destination, the second radius being smaller than the first radius.

A vehicle includes a battery, an engine, and a controller configured to, responsive to the vehicle being within a first predefined distance of a previously-identified destination during engine off and available battery energy being greater than a first amount of energy necessary to exclusively power the vehicle to the destination and beyond, inhibit requests to start the engine until the vehicle exits a first area about the destination defined by the first predefined distance regardless of ignition cycling.

BRIEF DESCRIPTION OF THE DRAWINGS

FIG. 1C is a block diagram of a plug-in hybrid electric vehicle (PHEV) illustrating a typical drivetrain and energy storage components;

FIG. 1D is a block diagram illustrating a frequent destination table of a battery controller;

DETAILED DESCRIPTION

Figure 1A:
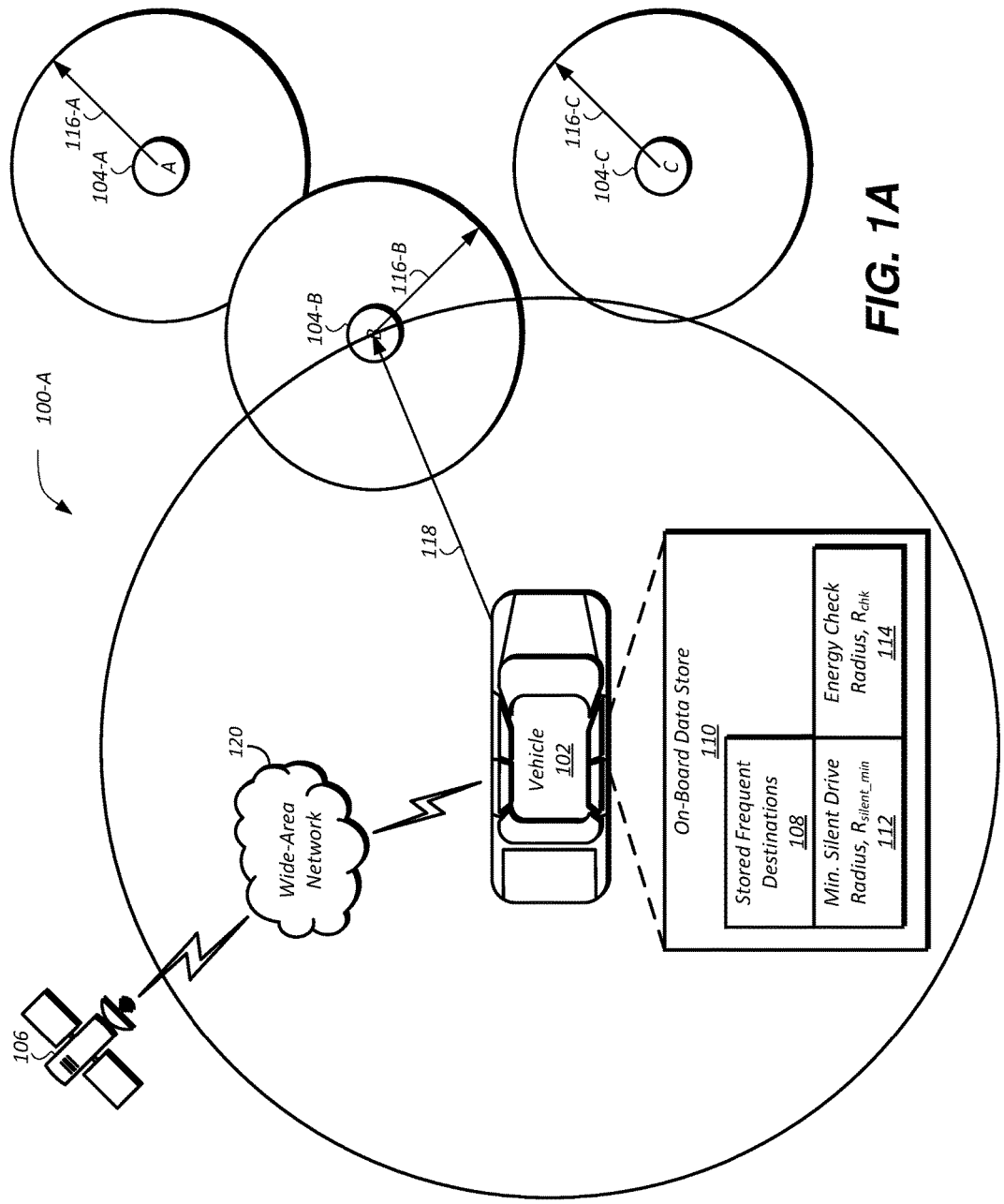
FIGS. 1A and 1B are block diagrams illustrating a silent drive radius system.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A reduced-emissions vehicle may be configured to include one or more sources of power, such as, but not limited to, a gasoline or a diesel engine, a traction battery, and so on. The vehicle may be configured to selectively enable and disable the power sources in response to detecting that one or more predefined criteria has been met. The vehicle may, accordingly, operate in one or more operating modes based on the source(s) supplying propulsion energy, such as, but not limited to, an engine-only operating mode with the engine supplying most the propulsion energy, an electric mode with the traction battery supplying all or most the propulsion energy, and so on.

The vehicle may be further configured to operate one or more power sources to maintain or assist another power source of the vehicle. The vehicle may be configured, for example, to operate the engine to affect an operating mode of the traction battery and vice versa. As one example, the vehicle may be configured to operate the engine to selectively, periodically, or continuously charge and/or discharge the traction battery. As another example, the vehicle may be configured to operate the engine to selectively, periodically, or continuously maintain a charge level of the traction battery, or any combination thereof. The vehicle may, accordingly, be configured to regulate the operating modes of the traction battery based on one or more operating parameters indicative of the traction battery performance, such as, but not limited to, battery capacity, open circuit voltage, terminal voltage, practical capacity, discharge rate, state of charge (SOC), state of discharge (SOD), depth of discharge (DOD), battery energy, specific energy, battery power, specific power, and so on. As one example, the vehicle may be configured to determine total energy of the traction battery based on one or more of battery capacity and discharge voltage. The use of other values, parameter states, measurements, and data points is also contemplated.

The operating modes of the vehicle may be further defined based on an amount of the propulsion energy provided by the one or more sources of power, i.e., engine assist, battery assist, engine-only, battery-only operating modes, as some examples. The operating modes may be further defined by an amount of emissions output by the vehicle, such as, but not limited to, one or more of a particulate matter (PM), hydrocarbons (HC), nitrogen oxides (NOx), carbon monoxide (CO), sulfur dioxide ($SO_2$), toxics, and greenhouse gases. As one example, the electric silent drive mode may include an operating mode of the vehicle where vehicle emissions are diminished, minimized, or eliminated, as compared to other operating modes.

In a vehicle equipped with a traction battery and an engine, for example, a battery controller may be configured to issue one or more commands to selectively enable and disable the engine and/or the battery responsive to one or more predefined operating conditions having being met. The vehicle may be configured to disable the engine (and/or enable the battery to provide all requested operating energy) in response to detecting that the vehicle is within a minimum silent drive radius of a previously-identified frequent destination. The minimum silent drive radius may include a predefined radial distance from the frequent destination and may be defined by a government regulation, manufacturer specification, user selection, planned development or gated community ordinance, or another source of minimum silent drive radius criteria.

The vehicle may be configured to disable the engine (and/or enable the battery to provide all requested operating energy) in response to an available battery energy (kW-hr) being greater than or equal to an average silent drive energy, the average silent drive energy being representative of an amount of energy used to reach the frequent destination during a previous trip from a distance of the minimum silent radius. Furthermore, the vehicle operating within a predefined distance of the previously-identified frequent destination may disable or inhibit operation of the engine (and/or enable the battery to provide all requested operating energy) in response to the available battery energy exceeding twice (e.g., two times or double) the amount of energy used to reach the frequent destination from the distance of a minimum silent radius. The vehicle, thereby, may be configured to disable/inhibit operation of the engine to reach the frequent destination from the distance of the minimum silent drive radius and, continue to disable/inhibit operation of the engine to recede from the frequent destination to a distance of the minimum silent drive radius.

In one example, the vehicle may be configured to detect that its own geographic location is within an energy check radius. The energy check radius may be a predefined radial distance from the frequent destination defined by a government regulation, manufacturer specification, user selection, planned development or gated community bylaws, or another source of energy check radius criteria. An average approach energy may be indicative of an amount of energy used to reach a minimum silent drive radius of the destination during a previous trip from a distance of the energy check radius. Moreover, the vehicle may be configured to increase the silent drive radius about the corresponding frequent destination to a value greater than the minimum silent drive radius by adding twice the total amount of energy used to approach the minimum silent drive radius about the same destination during a current trip to the average approach energy defined by the amount of energy used to reach the minimum silent drive radius during one or more previous trips.

FIG. 1A illustrates an example vehicle system 100-A for enabling an electric drive operating mode in response to detecting that the vehicle 102 is within a predefined distance of a previously-identified frequent destination 104. In one example, the vehicle 102 may be in communication, e.g., via a wide-area network 120, with a positioning system 106 and may be configured to receive, from the positioning system 106, its own geographic location, e.g., geographic coordinates.

In response to receiving the geographic coordinates, the vehicle 102 may be configured to identify a current geographic location as the frequent destination 104 in response to detecting an ignition-off event and/or in response to detecting that a number of ignition-off events at the current location exceeds a predefined threshold. The vehicle 102 may, accordingly, store the identified frequent destinations 104, e.g., stored destinations 108, in an on-board data store 110 for use in enabling and disabling the electric drive operating mode. Other criteria for determining and/or storing the frequent destinations 104 is also contemplated. As one example, the vehicle 102 may be configured to identify the current geographic location as the frequent destination 104 based on one or more parameters and states, such as, but not limited to, brake pedal position, accelerator pedal position, transmission gear state, ignition-off time, among others.

The data store 110 of the vehicle 102 may store a minimum silent drive radius, $R_{silent\_min\_stored}$ 112 and an energy check radius, $R_{chk\_stored}$ 114. The stored minimum silent drive radius, $R_{silent\_min\_stored}$ 112 may be representative of a predefined radial distance (hereinafter, minimum silent drive radius, $R_{silent\_min}$) 116 from the frequent destination 104, and may be same or different for each of the stored destinations 108. As one example, the minimum silent drive radius, $R_{silent\_min}$ 116 may be defined by a government regulation, manufacturer specification, user selection, planned development or gated community ordinance, or another source of minimum silent drive radius criteria.

The stored energy check radius, $R_{chk\_stored}$ 114 may be representative of a predefined radial distance (hereinafter, energy check radius, $R_{chk}$) 118 from the current location of the vehicle 102. The vehicle 102 may be configured to continuously or periodically check whether the current location of the vehicle 102 is within the energy check radius, $R_{chk}$ 118 from at least one frequent destination 104, such as by detecting whether current geographic coordinates of the vehicle 102 are within the distance value of the stored energy check radius, $R_{chk\_stored}$ 114 from those of the stored frequent destinations 108 of the data store 110. As with the minimum silent drive radius, $R_{silent\_min}$ 116, the energy check radius, $R_{chk}$ 118 may be based on one or more of an optimal energy use value for a given vehicle 102, vehicle manufacturer energy use policy, or state, federal, and/or local regulatory emissions requirements, restrictions, or guidelines.

Figure 1B:
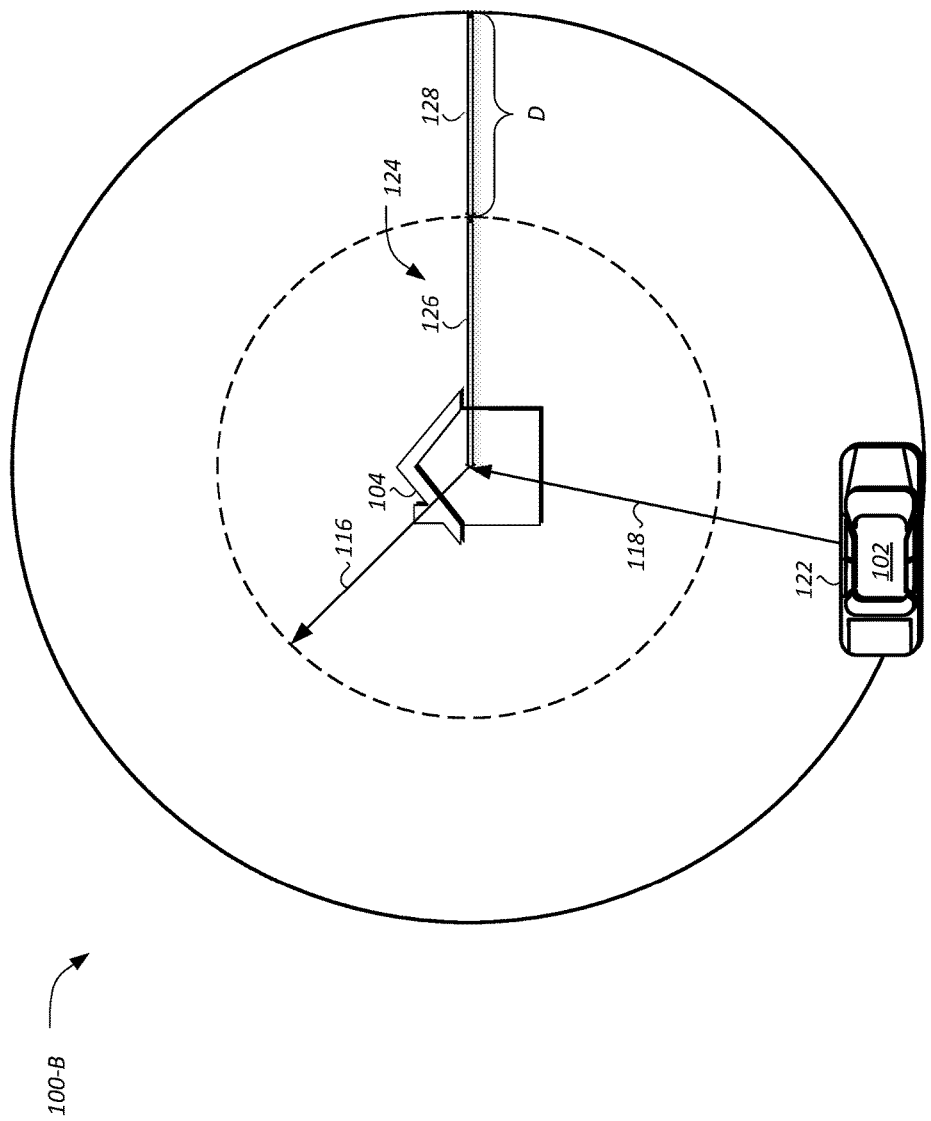

FIG. 1B illustrates an example vehicle system 100-B for enabling an electric drive operating mode in response to detecting that the vehicle 102 is within the energy check radius, $R_{chk}$ 118 of the frequent destination 104 and a total available battery energy, $E_{batt\_avail}$ 122 of the vehicle 102 being greater than an average silent drive energy, $E_{silent\_avg}$ 124. The average silent drive energy, $E_{silent\_avg}$ 124 may include two times (e.g., twice or double) a minimum silent drive energy, $E_{silent\_min}$ 126, i.e., the amount of energy used to reach the frequent destination 104 from the distance of the minimum silent drive radius, $R_{silent\_min}$ 116. The vehicle 102, thereby, may disable/inhibit operation of the engine to reach the frequent destination 104 from the distance of the minimum silent drive radius, $R_{silent\_min}$ 116 and continue to disable/inhibit operation of the engine to recede from the frequent destination 104 to a distance of the minimum silent drive radius, $R_{silent\_min}$ 116 responsive to the total available battery energy, $E_{batt\_avail}$ 122 of the vehicle 102 being greater than the average silent drive energy, $E_{silent\_avg}$ 124.

In response to the total available battery energy, $E_{batt\_avail}$ 122 of the vehicle 102 being greater than the average silent drive energy, $E_{silent\_avg}$ 124, the vehicle 102 may be further configured to detect an average approach energy, $E_{app\_avg}$ 128 of the frequent destination 104. The average approach energy, $E_{app\_avg}$ 128 may be indicative of an amount of energy the vehicle 102 used to travel a distance, D between the energy check radius, $R_{chk}$ 118 and the minimum silent drive radius, $R_{silent\_min}$ 116. In one example, the vehicle 102 may initiate recording of one or more energy consumption values in response to detecting that its current geographic location is equal to or less than the energy check radius, $R_{chk}$ 118 from the frequent destination 104. The vehicle 102 may, accordingly, terminate the recording of the energy consumption values in response to detecting that its current geographic location is equal to or less than the minimum silent drive radius, $R_{silent\_min}$ 116 from the frequent destination 104. The amount of energy the vehicle 102 used between initiating and terminating the recording of the values may be indicative of the average approach energy, $E_{app\_avg}$ 128 corresponding to the frequent destination 104.

As described further in reference to at least FIG. 1D, the vehicle 102 may be configured to detect and store corresponding values of the average silent drive energy, $E_{silent\_avg}$ 124 for each of the frequent destinations 104. The vehicle 102 may also be configured to detect and store corresponding values of the average approach energy, $E_{app\_avg}$ 128 for each of the frequent destinations 104.

FIG. 1C illustrates an example plug-in hybrid-electric vehicle (PHEV) power system 100-C of the vehicle 102. The vehicle 102 may comprise a hybrid transmission 130 mechanically connected to an engine 132 and a drive shaft 134 driving wheels 136. The hybrid transmission 130 may also be mechanically connected to one or more electric machines 138 capable of operating as a motor or a generator. The electric machines 138 may be electrically connected to an inverter system controller (ISC) 140 providing bi-directional energy transfer between the electric machines 138 and at least one traction battery 142.

The traction battery 142 typically provides a high voltage (HV) direct current (DC) output. In a motor mode, the ISC 140 may convert the DC output provided by the traction battery 142 to a three-phase alternating current (AC) as may be required for proper functionality of the electric machines 138. In a regenerative mode, the ISC 140 may convert the three-phase AC output from the electric machines 138 acting as generators to the DC required by the traction battery 142. In addition to providing energy for propulsion, the traction battery 142 may provide energy for high voltage loads 144, such as compressors and electric heaters, and low voltage loads 146, such as electrical accessories, an auxiliary 12 V battery, and so on.

The vehicle 102 may be configured to recharge the traction battery 142 via a connection to a power grid. The vehicle 102 may, for example, cooperate with electric vehicle supply equipment (EVSE) 148 of a charging station to coordinate the charge transfer from the power grid to the traction battery 142. In one example, the EVSE 148 may have a charge connector for plugging into a charge port 150 of the vehicle 102, such as via connector pins that mate with corresponding recesses of the charge port 150. The charge port 150 may be electrically connected to an on-board power conversion controller (hereinafter, charger) 152. The charger 152 may condition the power supplied from the EVSE 148 to provide the proper voltage and current levels to the traction battery 142. The charger 152 may interface with the EVSE 148 to coordinate the delivery of power to the vehicle 102.

The vehicle 102 may be designed to receive single- or three-phase AC power from the EVSE 148. The vehicle 102 may further be capable of receiving different levels of AC voltage including, but not limited to, Level 1 120-volt (V) AC charging, Level 2 240 V AC charging, and so on. In one example, both the charge port 124 and the EVSE 148 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, and so on.

The traction battery 142 may include a battery controller 154 configured to manipulate a plurality of connectors and switches of a bussed electrical center (BEC) 156 to enable the supply and withdrawal of electric energy to and from the traction battery 142. The battery controller 154 may be configured to determine one or more operating parameters corresponding to the traction battery 142 based on one or more measured and/or estimated properties of the traction battery 142. The battery controller 154 may be electrically connected to and in communication with one or more other vehicle controllers.

In one example, the battery controller 154 is in communication with a telematics controller 158 of the vehicle 102. The telematics controller 158 may be configured to communicate, such as via a wireless transceiver and/or a vehicle modem (not shown), with one or more positioning systems 106 using, for example, the network 120. The telematics controller 158 may be configured to transmit to the positioning system 106 a signal indicative of a request to provide geographic coordinates of the vehicle 102. The telematics controller 158 may be configured to store one or more frequent destinations 104 corresponding to the vehicle 102.

The telematics controller 158 and the battery controller 154 may each be electrically connected to and in communication with other vehicle controllers (not shown), such as, but not limited to, a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

While FIG. 1C depicts a plug-in hybrid electric vehicle, the description herein is equally applicable to a pure electric vehicle, a parallel hybrid vehicle, or a series hybrid vehicle, among others. For a pure electric vehicle, e.g., battery electric vehicle (BEV), the hybrid transmission 130 may be a gear box connected to the electric machine 138 and the engine 132 may not be present. The various components discussed may have one or more associated controllers to control and monitor the operation of the components. As one example, the telematics controller 158 may define, as well as, include or be in communication with, a vehicle system controller configured to control and monitor a plurality of vehicle functions, including, but not limited to, functions for enabling an electric drive operating mode in response to detecting that the vehicle 102 is within a predefined distance of a previously-identified frequent destination 104, as described in reference to at least FIGS. 1A and 1B. The controllers may communicate via a serial bus (e.g., Controller Area Network (CAN)) or via discrete conductors.

FIG. 1D illustrates an example table 100-D for the stored frequent destinations 108. The telematics controller 158 of the vehicle 102 may be configured to store current geographic location of the vehicle 102 as the frequent destination 104 in response to detecting that ignition of the vehicle 102 has been turned off, e.g., an ignition-off or a power down event. The telematics controller 158 may, for instance, request geographic coordinates of the vehicle 102 from the positioning system 106. The telematics controller 158 may associate a given stored frequent destination 108 with geographic coordinates 164 received from the positioning system 106. The telematics controller 158 may be further configured to determine a location average approach energy, $E_{app\_avg\_loc}$ 166 and a location average silent drive energy, $E_{silent\_avg\_loc}$ 168 corresponding to a given stored frequent destination 108.

The telematics controller 158 may be further configured to periodically or continuously update the location average approach energy, $E_{app\_avg\_loc}$ 166 and/or the location average silent drive energy, $E_{silent\_avg\_loc}$ 168 of the corresponding frequent destination 104. While FIG. 1D depicts the stored frequent destinations 108 stored in the data store 110 of the telematics controller 158, the description herein is equally applicable to on- or off-board data store or memory locations corresponding to one or more of the telematics controller, the battery controller, cloud storage locations, and so on.

Figure 2:
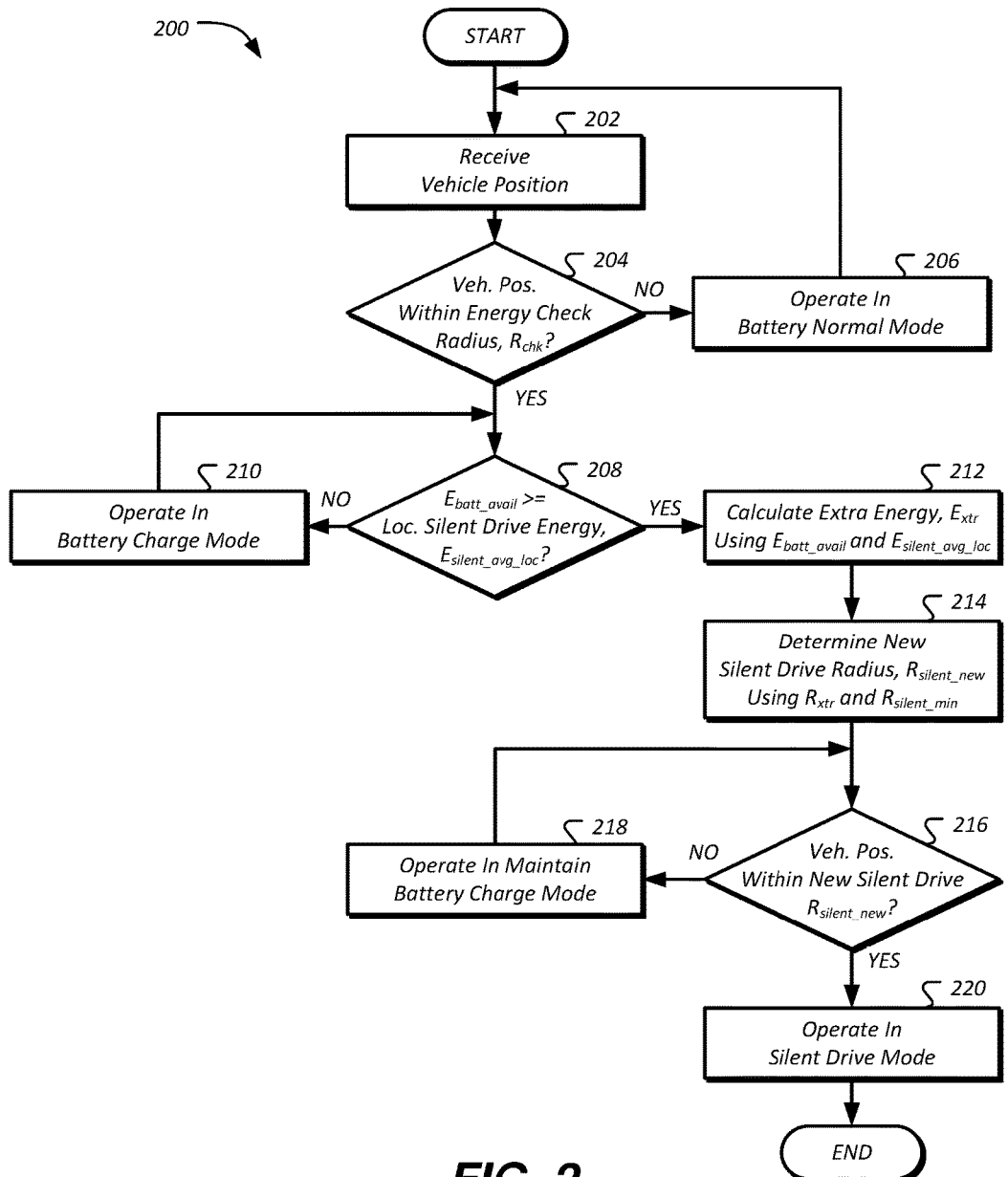
FIG. 2 is a flowchart illustrating an algorithm for enabling an electric drive operating mode.

FIG. 2 illustrates an example process 200 for operating the vehicle 102 in electric drive mode in response to detecting that the total available battery energy, $E_{batt\_avail}$ 122 of the vehicle 102 exceeds the location average silent drive energy, $E_{silent\_avg\_loc}$ 168 corresponding to the frequent destination 104, e.g., the stored frequent destination 108, that is within the energy check radius, $R_{chk}$ 118 from the vehicle 102. The process 200 may begin at operation 202 where the telematics controller 158 receives current geographic location of the vehicle 102. In one example, the telematics controller 158 may receive, from the positioning system 106, geographic coordinates corresponding to the current location of the vehicle 102.

The telematics controller 158, at operation 204, may determine whether the current geographic location of the vehicle 102 is within the energy check radius, $R_{chk}$ 118 from at least one frequent destination 104, e.g., at least one stored frequent destination 108. The energy check radius, $R_{chk}$ 118 may be a predefined radial distance from the current location of the vehicle 102 based, for example, on one or more of an optimal energy use value for a given vehicle 102, vehicle manufacturer energy use policy, state and/or federal regulatory emissions requirements, restrictions, or guidelines.

In response to detecting that the current geographic location of the vehicle 102 is not within the energy check radius, $R_{chk}$ 118 from at least one of the stored frequent destinations 108, the telematics controller 158, at operation 206, continues to operate the vehicle 102 in a normal operating mode. As one example, the telematics controller 158 may send a signal to the battery controller 154 indicating that the current operating mode of the vehicle 102 and/or traction battery 142 energy use strategy may be maintained. As another example, the telematics controller 158 may send a signal to the battery controller 154 to maintain and/or not inhibit engine 132 operation. The process 200 may then return to operation 202.

In response to detecting that the current geographic location of the vehicle 102 is within the energy check radius, $R_{chk}$ 118 from at least one stored frequent destination 108, the telematics controller 158, at operation 208, determines whether the total available battery energy, $E_{batt\_avail}$ 122 of the vehicle 102 is greater than the location average silent drive energy, $E_{silent\_avg\_loc}$ 168 corresponding to that stored frequent destination 108. The location average silent drive energy, $E_{silent\_avg\_loc}$ 168 of the stored frequent destination 108 may be indicative of the average silent drive energy, $E_{silent\_avg}$ 124 of the frequent destination 104, or two times (e.g., twice or double) the minimum silent drive energy, $E_{silent\_min}$ 126, i.e., the amount of energy used to reach the stored frequent destination 108 from the distance of the minimum silent drive radius, $R_{silent\_min}$ 116.

If the total available battery energy, $E_{batt\_avail}$ 122 of the vehicle 102 is less than the location average silent drive energy, $E_{silent\_avg\_loc}$ 168 corresponding to the stored frequent destination 108, the telematics controller 158, at operation 210, initiates operation of the vehicle 102 in a battery charge operating mode. The telematics controller 158 may, for example, send a signal to the battery controller 154 indicating that the charge operating mode of the traction battery 142 may be enabled. The charge operating mode may include increasing an amount of power and/or energy generated by the engine 132 relative to that of the traction battery 142. The charge operating mode of the traction battery 142 may also include decreasing or inhibiting partially or wholly the use of the traction battery 142 energy for propulsion of the vehicle 102 and other operating needs of the vehicle 102.

The telematics controller 158, at operation 212, calculates an extra energy, $E_{xtr}$ in response to detecting that the total available battery energy, $E_{batt\_avail}$ 122 of the vehicle 102 is greater than the location average silent drive energy, $E_{silent\_avg\_loc}$ 168 corresponding to the stored frequent destination 108. As one example, the telematics controller 158 may determine the extra energy, $E_{xtr}$ using the total available battery energy, $E_{batt\_avail}$ 122 and the location average silent drive energy, $E_{silent\_avg\_loc}$ 168. The telematics controller 158 may, for instance, subtract the location average silent drive energy, $E_{silent\_avg\_loc}$ 168 from the total available battery energy, $E_{batt\_avail}$ 122 of the vehicle 102.

At operation 214, the telematics controller 158 calculates a new silent drive radius, $R_{silent\_new}$ indicative of an extra silent drive radius, $R_{xtr}$ that the vehicle 102 may operate in electric drive mode that is in addition to the minimum silent drive radius, $R_{silent\_min}$ 116. The telematics controller 158 may, for example, determine an energy ratio indicative of a relative relationship of the extra energy, $E_{xtr}$ and the location average approach energy, $E_{app\_avg\_loc}$ 166 of the frequent destination 104 that is within the energy check radius, $R_{chk}$ 118 from the current geographic location of the vehicle 102. The telematics controller 158 may, accordingly, calculate the energy ratio by dividing the extra energy, $E_{xtr}$ by the location average approach energy, $E_{app\_avg\_loc}$ 166.

Additionally or alternatively, the telematics controller 158 may be configured to calculate the extra silent drive radius, $R_{xtr}$ or the distance the vehicle 102 may operate in electric drive mode that is in addition to the minimum silent drive radius, $R_{silent\_min}$ 116, based on the energy ratio and a difference between the energy check radius, $R_{chk}$ 118 and the minimum silent drive radius, $R_{silent\_min}$ 116. The telematics controller 158 may, thereby, determine the extra silent drive radius, $R_{xtr}$ as indicated in Equation (1):

$$R_{xtr} = \left(\frac{E_{xtr}}{E_{app\_avg\_loc}}\right)(R_{chk} - R_{silent\_min}),\quad (1)$$

where the ratio of $E_{xtr}$ and $E_{app\_avg\_loc}$ is the energy ratio. The telematics controller 158 may be configured to calculate the new silent drive radius, $R_{silent\_new}$ using a sum of the extra silent drive radius, $R_{xtr}$ and the minimum silent drive radius, $R_{silent\_min}$ 116. In some examples, the new silent drive radius, $R_{silent\_new}$ may be greater than or equal to the minimum silent drive radius, $R_{silent\_min}$ 116, such that calculating the extra silent drive radius, $R_{xtr}$ may increase (or leave unchanged) the distance the vehicle 102 is operated in the silent drive mode.

At operation 216, the telematics controller 158 determines whether current vehicle 102 position is within the new silent drive radius, $R_{silent\_new}$ from the stored frequent destination 108. If the vehicle 102 geographic location is not within the new silent drive radius, $R_{silent\_new}$, the telematics controller 158, at operation 218, sends a signal to the battery controller 154 indicating that the current operating mode of the vehicle 102 and/or traction battery 142 energy use strategy may be maintained. As another example, the telematics controller 158 may send a signal to the battery controller 154 to maintain and/or not inhibit engine 132 operation. The process 200 may then return to operation 216.

At operation 220, the telematics controller 158 sends a signal to the battery controller 154 indicative of a request to enable the silent drive operating mode of the traction battery 142. As some examples, enabling the silent drive operating mode may include increasing an amount of power and/or energy provided by the traction battery 142 relative to that of the engine 132, decreasing or inhibiting partially or wholly the use of the engine 132 energy for propulsion and other operating needs of the vehicle 102 and so on. At this point the process 200 may end. In some examples, the process 200 may be repeated in response to receiving current geographic location of the vehicle 102 or in response to receiving another signal or request.

While the description above presupposes that the total available battery energy, $E_{batt\_avail}$ 122 of the vehicle 102, as determined, for example, at operation 208, is greater than the location average silent drive energy, $E_{silent\_avg\_loc}$ 168 and the extra energy, $E_{xtr}$, as calculated, for example, at operation 212, may be greater than zero, the description is equally applicable in a scenario where the total available battery energy, $E_{batt\_avail}$ 122 of the vehicle 102 is equal to the location average silent drive energy, $E_{silent\_avg\_loc}$ 168 and that the extra energy, $E_{xtr}$ may, therefore, be zero. In such an event, the extra silent drive radius, $R_{xtr}$ may also be approximately equal to zero and the telematics controller 158 may be configured to send one or more signals to the enable the silent drive operation mode of the vehicle 102 in response to detecting that the current position of the vehicle 102 is within the minimum silent drive radius, $R_{silent\_min}$ 116.

Figure 3:
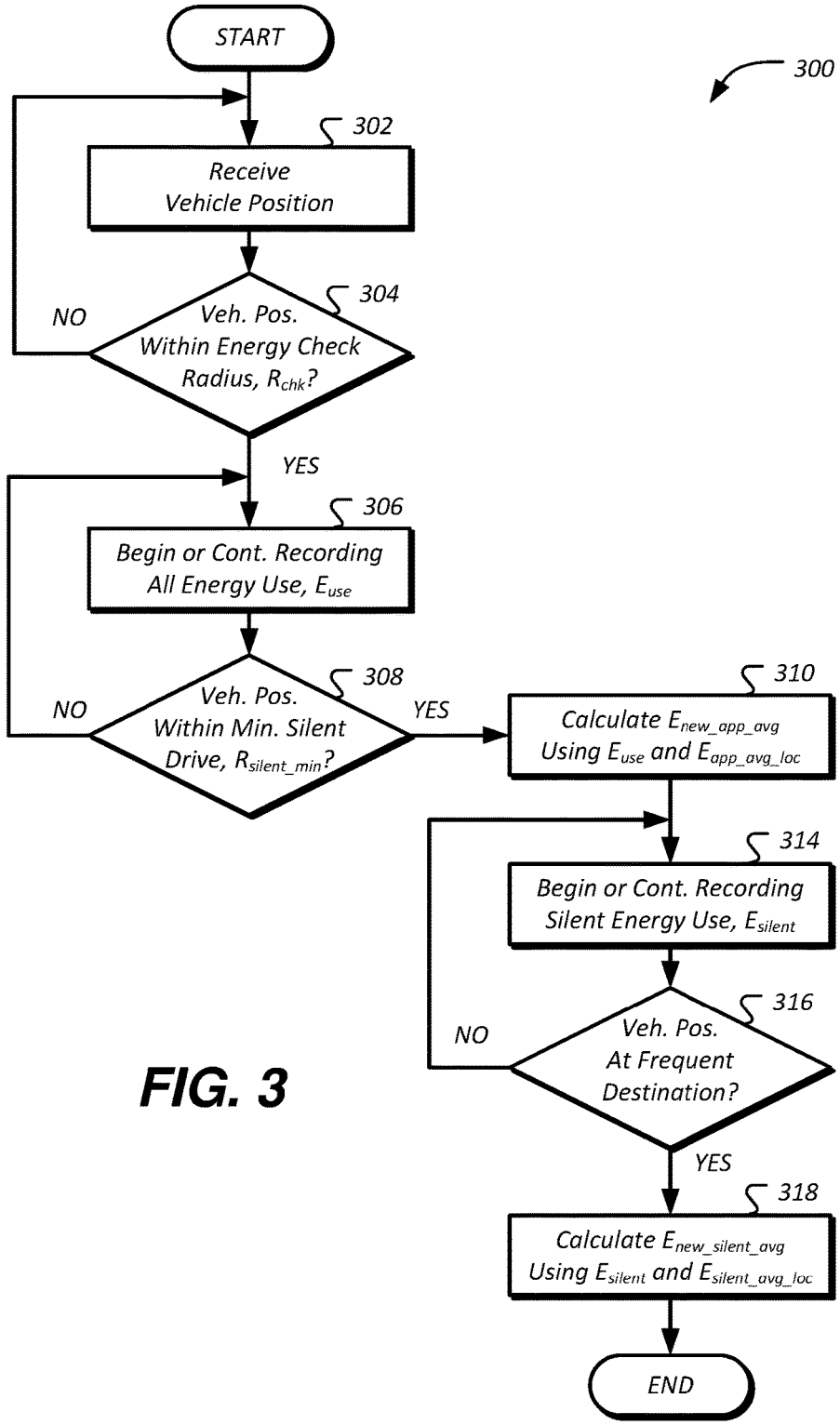
FIG. 3 is a flowchart illustrating an algorithm for updating an average approach energy value and an average silent drive energy value.

FIG. 3 illustrates an example process 300 for updating the location average approaching energy, $E_{app\_avg\_loc}$ 166 and the location average silent drive energy, $E_{silent\_avg\_loc}$ 168 values corresponding to the saved frequent destination 108. The process 300 may begin at operation 302 where the telematics controller 158 receives current geographic location of the vehicle 102. As one example, the telematics controller 158 may receive, from the positioning system 106, geographic coordinates corresponding to the current location of the vehicle 102.

At operation 304, the telematics controller 158 determines whether the current geographic location of the vehicle 102 is within the energy check radius, $R_{chk}$ 118 from at least one frequent destination 104, e.g., at least one stored frequent destination 108. If the current geographic location of the vehicle 102 is not within the energy check radius, $R_{chk}$ 118 from at least one of the stored frequent destinations 108, the process 300 returns to operation 302.

In response to detecting that the current geographic location of the vehicle 102 is within the energy check radius, $R_{chk}$ 118 from at least one stored frequent destination 108, the telematics controller 158, at operation 306, begins to record all energy use, $E_{use}$ by the vehicle 102. In one example, the vehicle 102 may initiate recording of one or more operating parameters (or changes in values, measurements, or states of the operating parameters) of the traction battery 142 and/or the engine 132 of the vehicle 102, such as, but not limited to, battery capacity, open circuit voltage, terminal voltage, practical capacity, discharge rate, SOC, SOD, DOD, battery energy, specific energy, battery power, specific power, fuel consumption, work, friction losses, compression ratio, expansion ratio, combustion temperatures, and oxygen level, among other parameters.

At operation 308, the telematics controller 158 determines whether that the current position of the vehicle 102 is within the minimum silent drive radius, $R_{silent\_min}$ 116 of at least one of the stored frequent destinations 108. If current geographic location of the vehicle 102 is farther away from the stored frequent destinations 108 than the minimum silent drive radius, $R_{silent\_min}$ 116, the process 300 returns to operation 306 where the telematics controller 158 may continue recording all energy use, $E_{use}$ of the vehicle 102, such as, for example, continue recording one or more operating parameters (or changes in values, measurements, or states of the operating parameters) of the traction battery 142 and/or the engine 132 indicative of the vehicle 102 power and/or energy use.

In response to detecting that the current position of the vehicle 102 is within the minimum silent drive radius, $R_{silent\_min}$ 116 of at least one of the stored frequent destinations 108, the telematics controller 158, at operation 310, terminates the recording and calculates a new average approach energy, $E_{new\_app\_avg}$, e.g., an amount of energy used to reach the minimum silent drive radius, $R_{silent\_min}$ 116 about the stored frequent destination 108, based on the captured energy use, $E_{use}$ of the vehicle 102 and the location average approach energy, $E_{app\_avg\_loc}$ 166 of the stored frequent destination 108. The telematics controller 158 may, for instance, calculate the new average approach energy, $E_{new\_app\_avg}$ used to reach the corresponding stored frequent destination 108 by adding the captured energy use, $E_{use}$ and the location average approach energy, $E_{app\_avg\_loc}$ 166 of that stored frequent destination 108. The telematics controller 158 may be configured to store a value of the calculated new average approach energy, $E_{new\_app\_avg}$ as the location average approach energy, $E_{app\_avg\_loc}$ 166 corresponding to the stored frequent destination 108.

Further, in response to detecting that the current position of the vehicle 102 is within the minimum silent drive radius, $R_{silent\_min}$ 116 of at least one of the stored frequent destinations 108, the telematics controller 158, at operation 314, begins to record all silent radius drive energy use, $E_{silent}$ by the vehicle 102. In one example, the vehicle 102 may initiate the recording of one or more operating parameters (or changes in values, measurements, or states of the operating parameters) of the traction battery 142 and/or the engine 132 of the vehicle 102, such as, but not limited to, battery capacity, open circuit voltage, terminal voltage, practical capacity, discharge rate, SOC, SOD, DOD, battery energy, specific energy, battery power, specific power, fuel consumption, work, friction losses, compression ratio, expansion ratio, combustion temperatures, and oxygen level, among other parameters.

At operation 316, the telematics controller 158 determines whether that the current position of the vehicle 102 is at the stored frequent destination 108. If current geographic location of the vehicle 102 is not at the stored frequent destination 108, the process 300 returns to operation 314 where the telematics controller 158 may continue recording the silent radius drive energy use, $E_{silent}$ of the vehicle 102, such as, for example, continue recording one or more operating parameters (or changes in values, measurements, or states of the operating parameters) of the traction battery 142 and/or the engine 132 indicative of the vehicle 102 power and/or energy use.

In response to detecting that the current position of the vehicle 102 is at the stored frequent destination 108, the telematics controller 158, at operation 318, terminates the recording and calculates a new average silent drive energy, $E_{new\_silent\_avg}$ used to reach the corresponding stored frequent destination 108 based on the captured silent radius drive energy use, $E_{silent}$ of the vehicle 102 and the location average silent drive energy, $E_{silent\_avg\_loc}$ 168 of the stored frequent destination 108.

The telematics controller 158 may, for instance, calculate the new average silent drive energy, $E_{new\_silent\_avg}$ used to reach the corresponding stored frequent destination 108 from a distance of the minimum silent drive radius, $R_{silent\_min}$ 116 by adding the captured silent radius drive energy use, $E_{silent}$ and the location average silent drive energy, $E_{silent\_avg\_loc}$ 168 of that stored frequent destination 108. As another example, the telematics controller 158 may calculate the new average silent drive energy, $E_{new\_silent\_avg}$ by doubling the captured silent radius drive energy use, $E_{silent}$ prior to summing the resulting value and the location average silent drive energy, $E_{silent\_avg\_loc}$ 168. The telematics controller 158 may further divide the sum of the values by two to compute the new average silent drive energy, $E_{new\_silent\_avg}$. The telematics controller 158 may, thereby, calculate the new average silent drive energy, $E_{new\_silent\_avg}$ used to reach the corresponding stored frequent destination 108 from a distance of the minimum silent drive radius, $R_{silent\_min}$ 116 as indicated in Equation (2):

$$E_{new\_silent\_avg} = \frac{(E_{silent} \times 2) + E_{silent\_avg\_loc}}{2}. \quad (2)$$

The telematics controller 158 may be configured to store a value of the calculated new average silent drive energy, $E_{new\_silent\_avg}$ as the location average silent drive energy, $E_{silent\_avg\_loc}$ 168 corresponding to the stored frequent destination 108. At this point the process 300 may end. In some examples, the process 300 may be repeated in response to receiving current geographic location of the vehicle 102 or in response to receiving another signal or request.

By doubling the value of the captured silent radius drive energy use, $E_{silent}$ prior to summing the result and the location average silent drive energy, $E_{silent\_avg\_loc}$ 168 of that stored frequent destination 108, the telematics controller 158 maintains the location average silent drive energy, $E_{silent\_avg\_loc}$ 168 as two times (e.g., twice or double) the amount of energy used to reach the corresponding stored frequent destination 108 from the distance of the new (and expanded) silent drive radius greater than the minimum silent drive radius, $R_{silent\_min}$ 116. The vehicle 102, thereby, may disable/inhibit operation of the engine to reach the corresponding frequent destination 108 from the distance of the new (and expanded) silent drive radius that is greater than the minimum silent drive radius, $R_{silent\_min}$ 116 and continue to disable/inhibit operation of the engine to recede from that frequent destination 108 to a distance of the new (and expanded) silent drive radius that is greater than the minimum silent drive radius, $R_{silent\_min}$ 116 responsive to the total available battery energy, $E_{batt\_avail}$ 122 of the vehicle 102 being greater than or equal to the location average silent drive energy, $E_{silent\_avg\_loc}$ 168 that has been updated using the calculated new average silent drive energy, $E_{new\_silent\_avg}$.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
    a traction battery;
    an engine; and
    a controller configured to inhibit requests to start the engine in response to both the vehicle being within a first radius about a previously-identified frequent destination and an available battery energy being greater than twice a total battery energy expended during a prior trip to the destination from a second radius about the destination, the second radius being smaller than the first radius.

2. The system of claim 1, wherein the controller is further configured to inhibit the requests in response to the vehicle being within the second radius.

3. The system of claim 1, wherein the controller is further configured to calculate, based on a difference between the available energy and twice the total energy, a third radius about the destination, the third radius being both smaller than the first radius and larger than the second radius, and inhibit the requests in response to the vehicle being within the third radius.

4. The system of claim 3, wherein the controller is further configured to calculate the third radius based on an approach energy expended during the prior trip to the second radius from the first radius.

5. The system of claim 1, wherein the controller is further configured to inhibit requests for the available energy in response to the available energy being less than twice the total energy.

6. The system of claim 1, wherein the controller is further configured to detect that the vehicle is within the first radius independent of a user input and a route used to reach the destination.

7. The system of claim 1, wherein the requests originate from at least one of a cabin climate control request, an acceleration request that is greater than an acceleration threshold, and a battery conditioning request that is greater than a conditioning threshold.

8. A method comprising:
inhibiting, by a controller, requests to start an engine of a vehicle in response to the vehicle being within a first radius about a previously-identified frequent destination and an available energy of a battery of the vehicle being greater than twice a total battery energy expended during a prior trip to the destination from a second radius about the destination, the second radius being smaller than the first radius.

9. The method of claim 8, wherein the inhibiting is further in response to the vehicle being within the second radius.

10. The method of claim 8 further comprising calculating, based on a difference between the available energy and twice the total energy, a third radius about the destination, the third radius being both smaller than the first radius and larger than the second radius, and inhibiting the requests in response to the vehicle being within the third radius.

11. The method of claim 10, wherein the calculating is further based on an approach energy expended during the prior trip to the second radius from the first radius.

12. The method of claim 8 further comprising inhibiting requests for the available energy in response to the available energy being less than twice the total energy.

13. The method of claim 8, wherein the detecting that the vehicle is within the first radius is independent of a user input and a route used to reach the destination.

14. The method of claim 8, wherein the requests originate from at least one of a cabin climate control request, an acceleration request that is greater than an acceleration threshold, and a battery conditioning request that is greater than a conditioning threshold.

15. A vehicle comprising:
a battery;
an engine; and
a controller configured to, responsive to the vehicle being within a first predefined distance of a previously-identified destination during engine off and available battery energy being greater than a first amount of energy necessary to exclusively power the vehicle to the destination and beyond, inhibit requests to start the engine until the vehicle exits a first area about the destination defined by the first predefined distance regardless of ignition cycling.

16. The vehicle of claim 15, wherein beyond includes exclusively powering the vehicle to an outer perimeter of the first area.

17. The vehicle of claim 15, wherein the controller is further configured to shut down the engine and inhibit the requests in response to the vehicle being within the first distance during engine on.

18. The vehicle of claim 15, wherein the destination is defined by a geographic location of the vehicle during ignition off.

19. The vehicle of claim 15, wherein the controller is further configured to inhibit the requests responsive to the vehicle being within a second predefined distance of the destination, the second distance being larger than the first distance, and a difference between the available energy and the first amount is less than a second amount of energy necessary to exclusively power the vehicle to the first area.

20. The vehicle of claim 19, wherein the controller is further configured to inhibit requests for the available energy responsive to the vehicle being within the second distance and the available energy being less than the first amount.

* * * * *